(12) United States Patent
Yamauchi et al.

(10) Patent No.: US 7,234,878 B2
(45) Date of Patent: Jun. 26, 2007

(54) OPTICAL FIBER CONNECTING DEVICE

(75) Inventors: Takaya Yamauchi, Kanagawa (JP); Akihiko Yazaki, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/595,079

(22) PCT Filed: Jul. 19, 2004

(86) PCT No.: PCT/US2004/023262

§ 371 (c)(1),
(2), (4) Date: Jan. 31, 2006

(87) PCT Pub. No.: WO2005/019890

PCT Pub. Date: Mar. 3, 2005

(65) Prior Publication Data

US 2006/0233500 A1   Oct. 19, 2006

(30) Foreign Application Priority Data

Aug. 11, 2003   (JP) .............................. 2003-207134

(51) Int. Cl.
*G02B 6/38* (2006.01)
*G02B 6/00* (2006.01)
(52) U.S. Cl. .................... 385/75; 385/70; 385/134; 385/135; 385/136
(58) Field of Classification Search ............ 385/53, 385/55, 70, 75, 95–99, 134–136
See application file for complete search history.

(56) References Cited

U.S. PATENT DOCUMENTS

| 4,818,055 A | 4/1989 | Patterson |
| 4,824,197 A | 4/1989 | Patterson |
| 4,865,412 A | 9/1989 | Patterson |
| 5,013,123 A | 5/1991 | Patterson |

(Continued)

FOREIGN PATENT DOCUMENTS

EP   1 074 869 A1   2/2001

OTHER PUBLICATIONS

U.S. Appl. No. 10/522,003, filed on Jul. 15, 2003, entitled "Optical Fiber Mechanical Splice with Strain Relief Mechanism".

*Primary Examiner*—Frank G. Font
*Assistant Examiner*—Michael Mooney
(74) *Attorney, Agent, or Firm*—Gregg H. Rosenblatt

(57) ABSTRACT

An optical fiber connecting device has a pair of holding elements which are formed on an actuating member and are capable of undergoing elastic deformation as a sheath holding mechanism for securing, to a body, the sheath portions S of the optical fibers F having uncoated fiber elements C to be held by the fiber-element securing member. The holding elements form a pair of passages for guiding the optical fibers F on the body. The holding elements undergo the elastic deformation accompanying the motion, on the body, of the actuating member for closing the fiber-element securing member, and push and hold the sheath portions S of the optical fibers F in the corresponding passages by utilizing their own elastic restoring forces. Each holding element includes a pressing part formed at a free end separated away from a fixed end part, and an engaging part positioned between the fixed end part and the pressing part.

7 Claims, 13 Drawing Sheets

U.S. PATENT DOCUMENTS 5,042,902 A * 8/1991 Huebscher et al. ........... 385/72
5,638,477 A    6/1997 Patterson et al.
5,999,682 A    12/1999 Vincent et al.

* cited by examiner

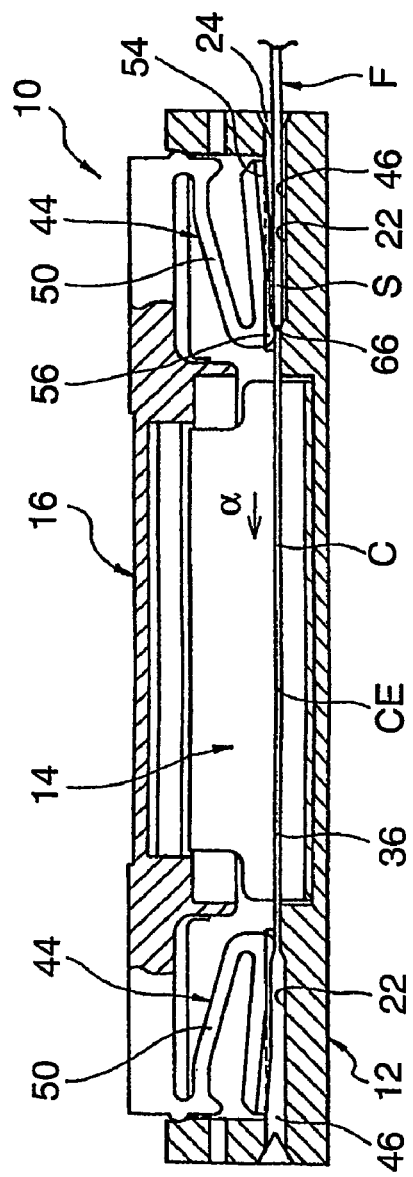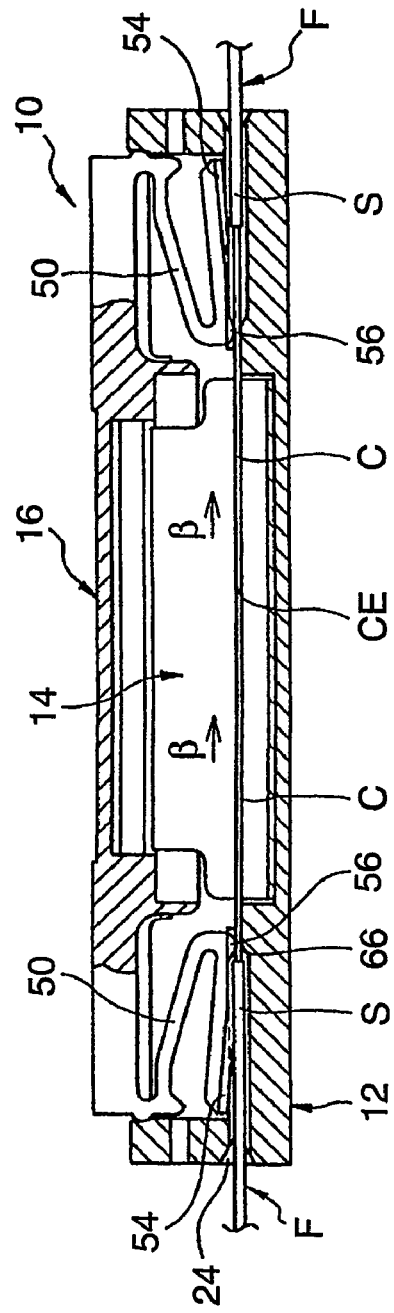

OPTICAL FIBER CONNECTING DEVICE

DETAILED DESCRIPTION OF THE INVENTION

TECHNICAL FIELD OF THE INVENTION

The present invention relates to an optical fiber connecting device capable of connecting together the uncoated fiber elements of a pair of optical fibers in an abutment condition.

BACKGROUND

In the technology for connecting optical fibers, there has been known, in the name of "mechanical splice", an optical fiber connecting device capable of permanently connecting together the uncoated fiber elements of optical fibers from which the sheaths are removed in a manner that their end surfaces are abut together in concentric without relying upon the melt-adhesion or adhesion. The optical fiber connecting device of this type, usually, is equipped with a fiber-element securing member having opposing holding surfaces that can be opened and closed to firmly hold the uncoated fiber elements of the optical fibers, at least either one of the opposing holding surfaces having a linear guide groove (e.g., a V-groove having a V-shape in cross section) for holding the uncoated fiber element of the optical fiber at a predetermined position. In carrying out the connection operation, the uncoated fiber elements of the pair of optical fibers are inserted in the guide grooves in the opposing holding surfaces of the fiber-element securing member that is opened in a condition where their ends are abut together (or an abutment condition). In this state, a pressure is exerted on the fiber-element securing member from the outer side, whereby the uncoated fiber elements of the two optical fibers are firmly secured in the opposing holding surfaces with the application of a required pressure so as to be permanently connected together in concentric in the guide grooves.

There has been known an optical fiber connecting device of this type comprising a body with cavity, a fiber-element securing member held in the cavity of the body in a manner that it can be opened and closed, and an actuating member mounted in the cavity of the body in a manner that it can be moved to open and close the fiber-element securing member (see, for example, Patent Document 1 (JP Pat. No. 2713309)). In the body are formed a pair of passages which are in concentric and aligned with each other, and being opened in the outer surfaces thereof and communicated with the cavity. The uncoated fiber elements of the pair of optical fibers are introduced in the corresponding passages and are guided into the fiber-element securing member. In conducting the connection operation, the actuating member is completely pushed into the cavity of the body to apply pressure to the fiber-element securing member which is opening at a position where the uncoated fiber elements of the pair of optical fibers are abut together at their ends and to move the fiber-element securing member to the closed position. Accordingly, the fiber-element securing member strongly secures the uncoated fiber elements of the two optical fibers in an abutment condition with the application of a required pressure and, thus, the pair of optical fibers are permanently connected together in a concentric manner.

With the optical fiber connection device disclosed in the Patent Document 1, the optical fibers that are to be connected are uncovered at their ends during the fiber connection operation over the regions longer than the lengths that are to be held by the fiber-element securing member. Therefore, the pair of optical fibers securely connected together through the optical fiber connecting device have their uncoated fiber element portions and the neighboring sheath portions that are received in their corresponding passages without being substantially locked, If the tensile action or twisting action is exerted on the optical fibers, the tensile stress or the twisting stress is concentrated on the uncoated fiber element portions that are arranged in the passages of the body without being locked, and the uncoated fiber elements may be damaged or broken, which may cause an optical loss. In order to avoid the stress from concentrating on the uncoated fiber elements, therefore, an optical fiber connecting device has been proposed comprising a sheath holding mechanism capable of securing the sheath portions of the optical fibers onto the body on the outer side of the fiber-element securing member (see, for example, Patent Document 2 (U.S. Pat. No. 5,638,477)).

In the optical fiber connecting device disclosed in the Patent Document 2, a pair of slots are formed in the body separately from the cavity so as to be communicated with a pair of passages in the body, and clip members having a U-shape in cross section are mounted in the slots in a manner to be displaced. Each clip member has a pair of arms facing each other maintaining a predetermined gap, and the sheath portion of the optical fiber arranged in the passage is received between these arms with the application of pressure. When the optical fibers are to be inserted in the passages of the body, the clip members are placed at positions where their both arms will not interfere with the sheaths of the optical fibers. After the uncoated fiber elements of the pair of optical fibers are held by the fiber-element securing member, the slip members are completely pushed into the corresponding slots in the body, whereby the sheath portions of the optical fibers in the passages are inserted into between the two arms of the clip members while being compressed, and the sheath portions are secured to the body. The sheath holding mechanism in the optical fiber connection device has also been disclosed in the specification of Japanese Patent Application No. 2002-240836 (see also U.S. patent application Ser. No. 10/522,003), which is a prior application filed by the present applicant.

SUMMARY

It is an object of the present invention to provide an optical fiber connecting device capable of connecting the uncoated fiber elements of a pair of optical fibers in an abutment condition, simplifying the fiber connection operation by decreasing the number of the constituent parts, conducting the fiber connection operation without using any special tool, and exhibiting a stable sheath-holding function without affected by dimensional error of the constituent parts.

In order to achieve the above object, the invention described herein provides an optical fiber connecting device for connecting uncoated fiber elements of a pair of optical fibers with each other in an abutment condition, comprising a body, a fiber-element securing member supported on the body to be operable between a closed position for securely holding an uncoated fiber element of an optical fiber and an opened position for releasing the uncoated fiber element, an actuating member supported on the body to operate the fiber-element securing member from the opened position to the closed position, and a sheath holding mechanism capable of holding a sheath portion of the optical fiber, in a fixed state relative to the body, with the uncoated fiber element thereof being securely held by the fiber-element securing member, wherein the sheath holding mechanism includes an elastically deformable holding element provided in the actuating member; and that the holding element defines in the body a passage for guiding an optical fiber, and is elastically deformed due to a motion of the actuating member on the body for operating the fiber-element securing member toward the closed position, to press and hold a sheath portion of the optical fiber in the passage by an elastic restoring force of the holding element.

In this optical fiber connection device, the holding elements formed on the actuating member undergo an elastic deformation accompanying the motion of the actuating member that moves the fiber-element securing member from the opened position to the closed position, thereby to exhibit the sheath-holding force for holding the sheath portions of the optical fibers owing to their own elastic restoring forces. The sheath holding mechanism requires no additional member. Besides, the sheath-holding force stems from the elastic restoring force of the holding element, and is little affected by the dimensional precision of the holding element.

The invention described herein provides an optical fiber connecting device according to that described above, wherein the holding element includes an elastic arm formed in the actuating member, the elastic arm including a fixed end part and a pressing part spaced away from the fixed end part for pressing the sheath portion of the optical fiber by an elastic restoring force of the elastic arm.

In this constitution, the sheath-holding force can be suitably controlled by adjusting the material and shape of the elastic arms.

The invention described herein provides an optical fiber connecting device according to that described above, wherein the elastic arm further includes an engaging part positioned between the fixed end part and the pressing part, the engaging part defining a constricted region in the passage for permitting an uncoated fiber element of the optical fiber to pass therethrough but for preventing the sheath portion of the optical fiber from passing therethrough.

In this constitution, the engaging part of the elastic arm has the constricted region that prevents the sheath portion of the optical fiber introduced into the passage from entering into the fiber-element securing member.

The invention described herein provides an optical fiber connecting device according to that described above, wherein the engaging part of the elastic arm opens the constricted region in the passage as the elastic arm is elastically deformed due to the motion of the actuating member on the body.

In this constitution, the elastic arm does not exert the elastic restoring force on the boundary region between the sheath portion of the optical fiber and the exposed uncoated fiber element.

The invention described herein provides an optical fiber connecting device according to that described above, wherein the body includes an inlet port opening in an outer surface of the body and communicated with the passage, the pressing part of the elastic arm being arranged close to the inlet port.

In this constitution, the elastic arm does not exert the elastic restoring force on the boundary region between the sheath portion of the optical fiber and the exposed uncoated fiber element.

The invention described herein provides an optical fiber connecting device according to that described above, wherein the holding element is integrally formed on the actuating member.

In this constitution, the holding elements of any shape can be easily produced.

The invention described herein provides an optical fiber connecting device for connecting uncoated fiber elements of a pair of optical fibers with each other in an abutment condition, comprising a fiber-element securing member for securing an uncoated fiber element of an optical fiber, and a sheath holding mechanism capable of holding a sheath portion of the optical fiber, in a fixed state, with the uncoated fiber element thereof being secured by the fiber-element securing member, characterized in that the sheath holding mechanism includes a holding element elastically deformable independently from the fiber-element securing member; and that the holding element defines a passage for guiding an optical fiber outside of the fiber-element securing member, and presses and holds a sheath portion of the optical fiber in the passage by an elastic restoring force of the holding element.

In this optical fiber connection device, the holding elements are independent from the fiber-element securing member and undergo an elastic deformation, thereby to exhibit the sheath-holding force for holding the sheath portions of the optical fibers owing to their own elastic restoring forces. The sheath-holding force stems from the elastic restoring force of the holding element, and is little affected by the dimensional precision of the holding element.

The optical fiber connecting device with the sheath holding mechanism disclosed in the Patent Document 2 uses clip members which are independent from the body, fiber-element securing member and the actuating member in order to secure the sheath portions of the optical fibers. Therefore, an increased number of constituent parts are required and an increased number of steps are required for assembling the optical fiber connecting device, i.e., the fiber connection operation tends to become complex. In particular, the sheath portions of the optical fibers are not held unless the clip members are pushed deep into the slots in the body and, hence, a special tool is necessary for the purpose of sheath-holding in the fiber connection operation. Besides, the pair of arms of the clip members are so constituted that the sheath portions of the optical fibers having an outer diameter slightly greater than the gap between the pair of arms are received between the pair of arms with the application of pressure. It is therefore probable that the sheath portions are held with varying forces due to dimensional error in forming the clip members and the sheaths of the optical fibers.

BRIEF DESCRIPTION OF THE DRAWINGS

FIG. 19(a–b) are sectional views illustrating a fiber connecting operation by the optical fiber connecting device of FIG. 1, wherein (a) illustrates a state where an optical fiber is inserted, and (b) illustrates a state where two optical fibers are inserted.

DETAILED DESCRIPTION

Figure 1:
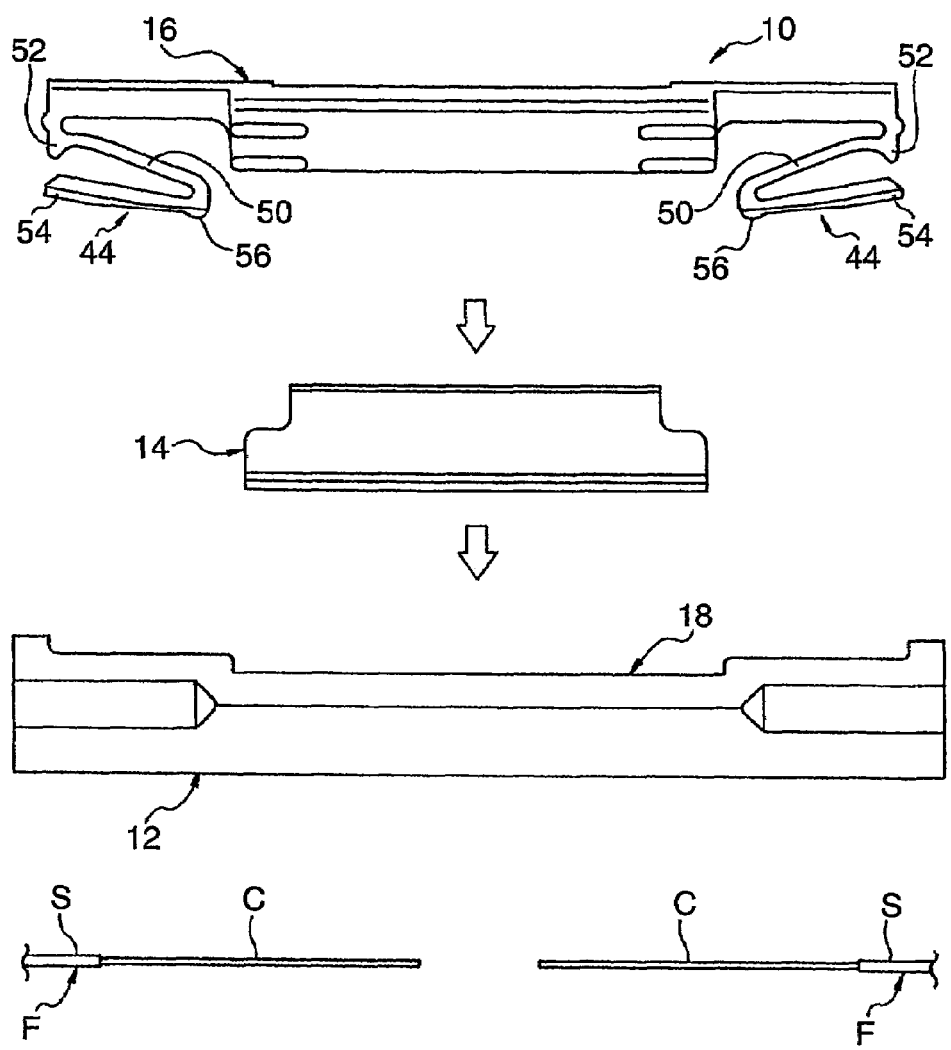
FIG. 1 is an exploded front view illustrating an optical fiber connecting device according to an embodiment of the present invention.

An embodiment of the present invention will now be described in detail with reference to the accompanying drawings. In all of the drawings, the corresponding constituent elements are denoted by common reference numerals.

Figure 2:
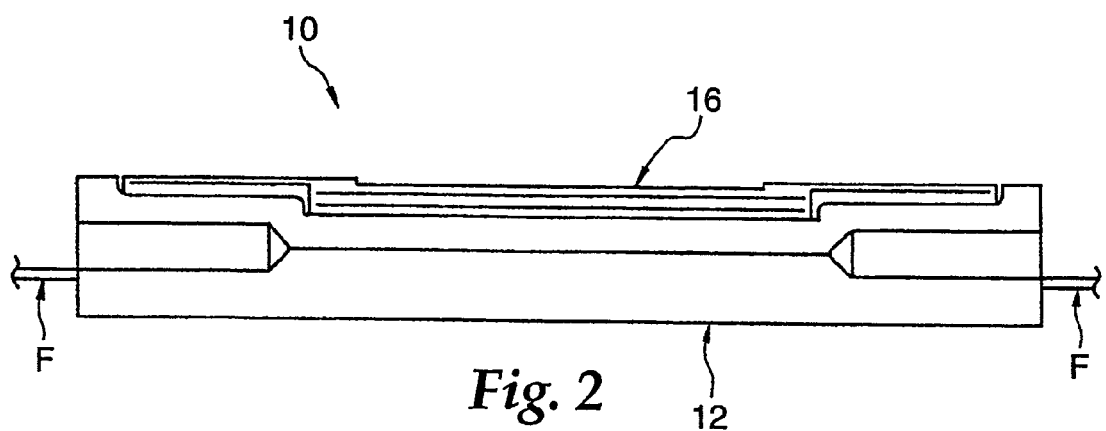
FIG. 2 is an assembled front view of the optical fiber connecting device of FIG. 1.
Figure 10:
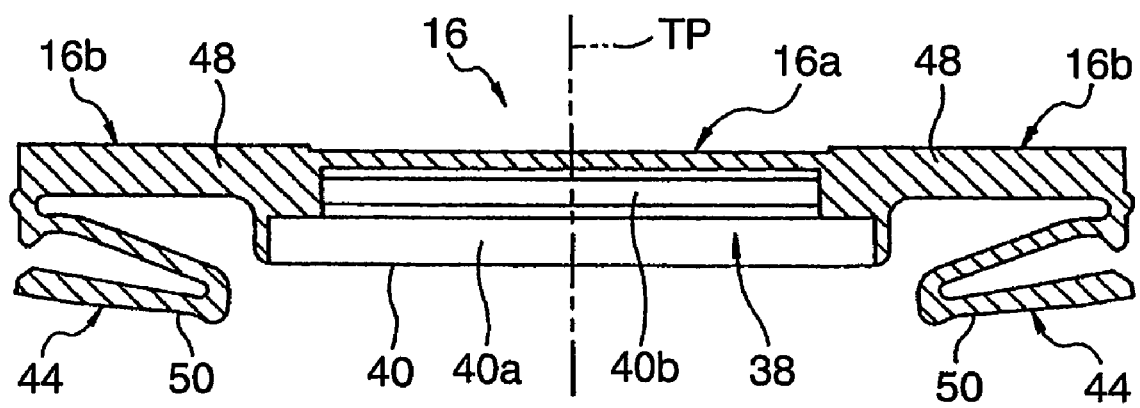
FIG. 10 is a sectional view of the actuating member taken along a line X—X in FIG. 9.
Figure 11:
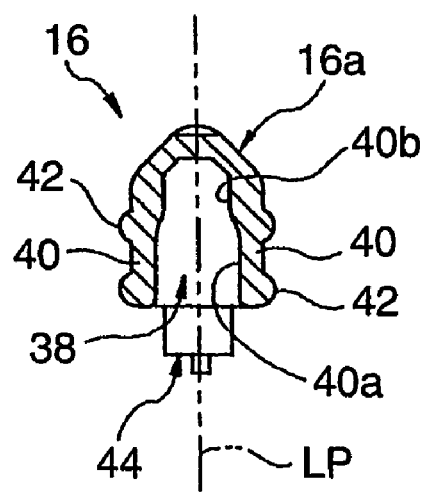
FIG. 11 is a sectional view of the actuating member taken along a line XI—XI in FIG. 9.
Figure 12A:
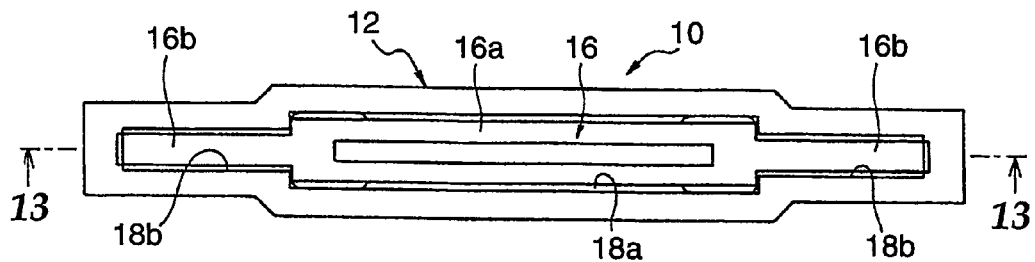
FIG. 12(a–c) are views illustrating the optical fiber connecting device of FIG. 1 in a temporarily mounting position, wherein (a) is a plan view, (b) is a front view and (c) is an end view.
Figure 12B:
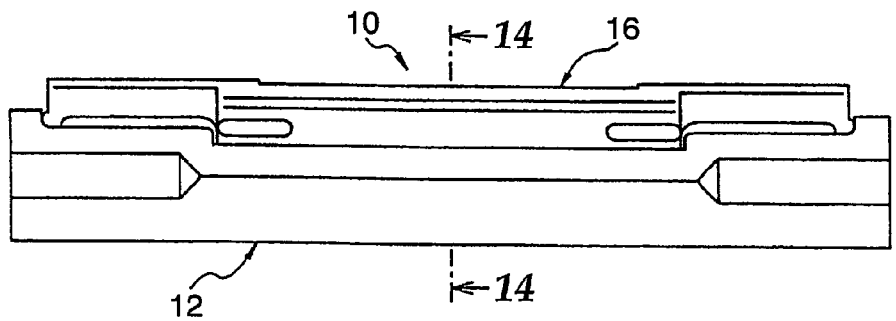
Figure 12C:
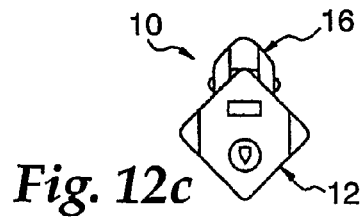
Figure 13:
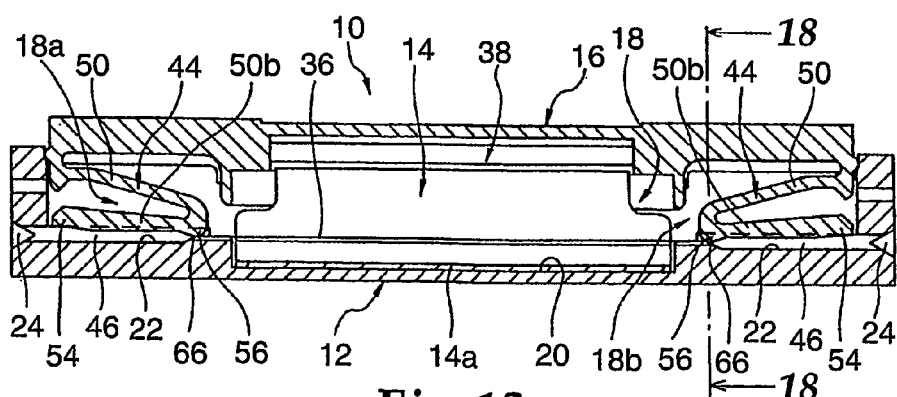
FIG. 13 is a sectional view of the optical fiber connecting device taken along a line XIII—XIII in FIG. 12.
Figure 14:
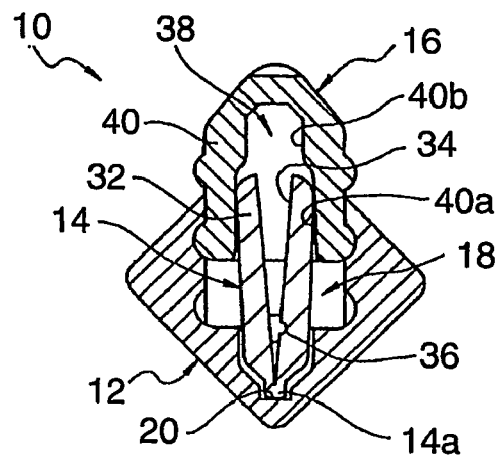
FIG. 14 is a sectional view of the optical fiber connecting device taken along a line XIV—XIV in FIG. 12.

FIGS. 1 and 2 are views illustrating an optical fiber connecting device 10 according to an embodiment of the present invention, FIGS. 3 to 11 are views illustrating the constituent elements in the optical fiber connecting device 10, and FIGS. 12 to 14 are views illustrating a half-finished state by temporarily assembling the constituent elements of the optical fiber connecting device 10. The optical fiber connecting device 10 is capable of permanently connecting the uncoated fiber elements C of a pair of optical fibers F from which the sheath is removed in a manner that their end surfaces are abut together in concentric without effecting melt-adhesion or adhesion.

The optical fiber connecting device 10 includes a body 12, a fiber-element securing member 14 supported by the body 12 and is capable of being opened and closed to firmly hold the uncoated fiber elements C of the optical fibers F, and an actuating member 16 supported by the body 12 and works to open and close the fiber-element securing member 14.

Figure 3A:
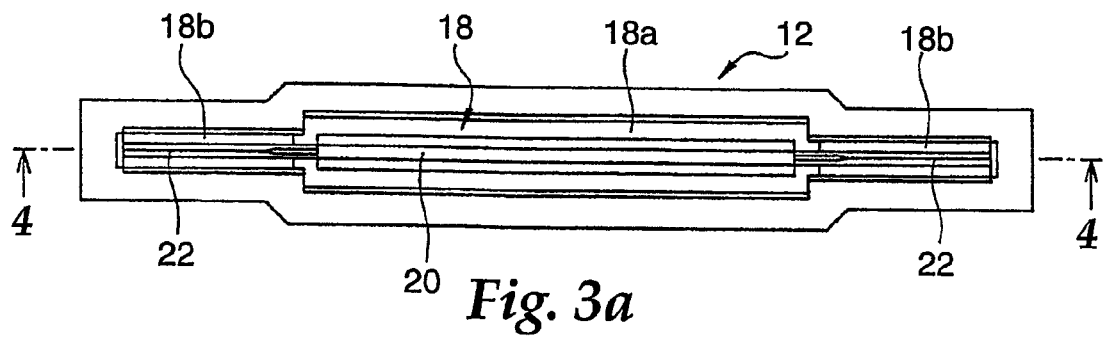
FIG. 3(a–c) are views of a body of the optical fiber connecting device of FIG. 1, wherein (a) is a plan view, (b) is a front view and (c) is an end view.
Figure 3B:
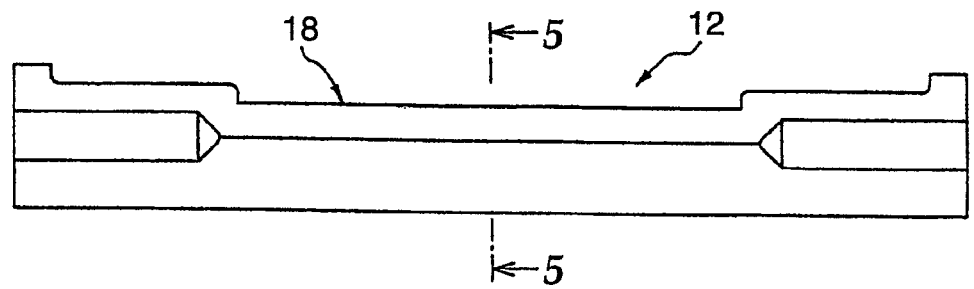
Figure 3C:
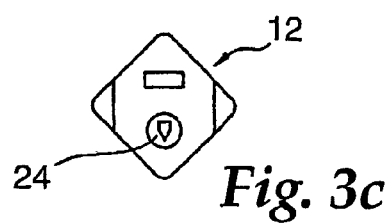
Figure 4:
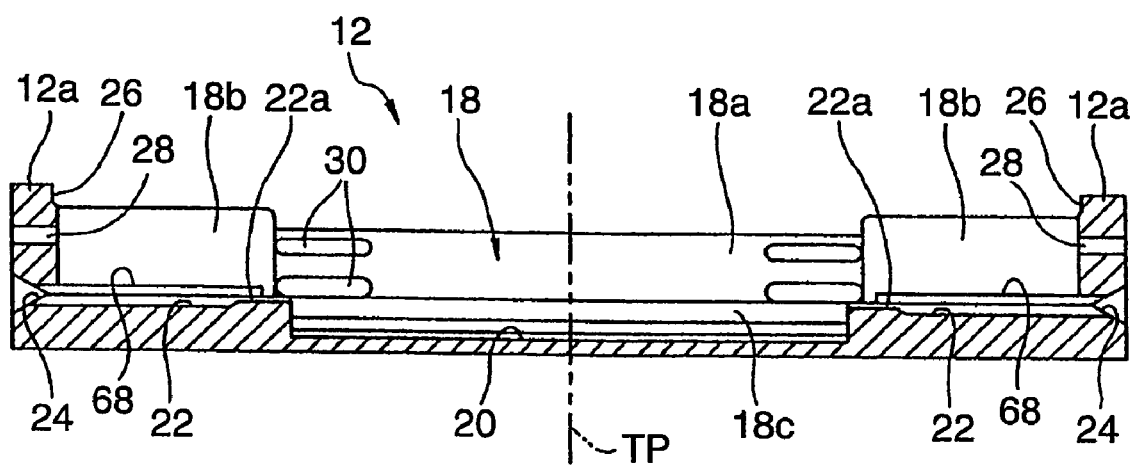
FIG. 4 is a sectional view of the body taken along a line IV—IV in FIG. 3.
Figure 5:
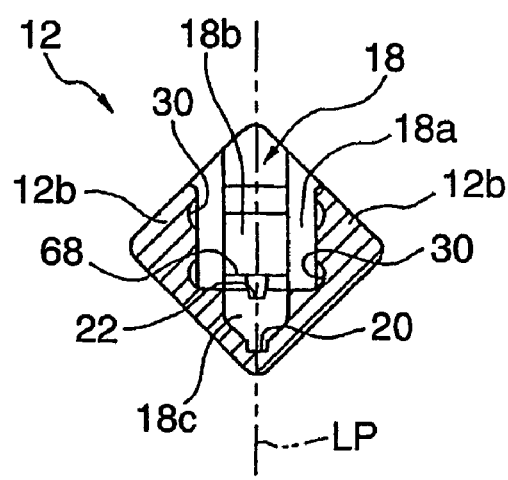
FIG. 5 is a sectional view of the body taken along a line V—V in FIG. 3.

Referring to FIGS. 3 to 5, the body 12 is a square member obtained by, for example, molding a resin material, and has a cavity 18 formed deep in a direction of one of the diagonal lines thereof so as to hold the fiber-element securing member 14 therein. The body 12 has a symmetrical shape on imaginary center planes TP and LP dividing the cavity 18 into two in the longitudinal direction and in the transverse direction.

The cavity 18 in the body 12 possesses a first portion 18a which is relatively wide at the center in the body 12 in the longitudinal direction and a pair of second portions 18b which are relatively narrow near both ends of the body 12 in the longitudinal direction, and is entirely opened in a ridge line region of the body 12. In the first portion 18a of the cavity 18, there is formed a relatively narrow bottom portion 18c that is formed deeper than the second portions 18b, and a support groove 20 is formed in the bottom portion extending straight along the bottom surface thereof. The first portion 18a receives and supports a hinge edge 14a that will be described later of the fiber-element securing member 14 in the support groove 20 thereby to accommodate the fiber-element securing member 14 in a manner that it can be opened and closed. In each second portion 18b of the cavity 18, there is formed a passage groove 22 (e.g., a V-groove having a V-shape in cross section) extending straight along the bottom surface thereof in alignment with the support groove 20 along the imaginary center plane LP. As will be described later, the second portions 18b accommodate a portion of the actuating member 16 in a manner to undergo elastic displacement.

The body 12 includes a pair of end walls 12a in the longitudinal direction and a pair of end walls 12b in the transverse direction defining the cavity 18. The end walls 12a in the longitudinal direction have inlet ports 24 that are open gradually expanding toward the outer surfaces and are communicated with the second portions 18b in the cavity 18. The pair of inlet ports 24 formed in the two end walls 12a in the longitudinal direction are linearly communicated with the corresponding passage grooves 22, and are arranged in alignment and in concentric with each other. In the end walls 12a in the longitudinal direction, there are locally formed dents 26 and through holes 28 at predetermined positions for engagement with the actuating member 16. In the end walls 12b in the transverse direction, similarly, there are locally formed a plurality of dents 30 at predetermined positions for engagement with the actuating member 16.

Figure 6A:
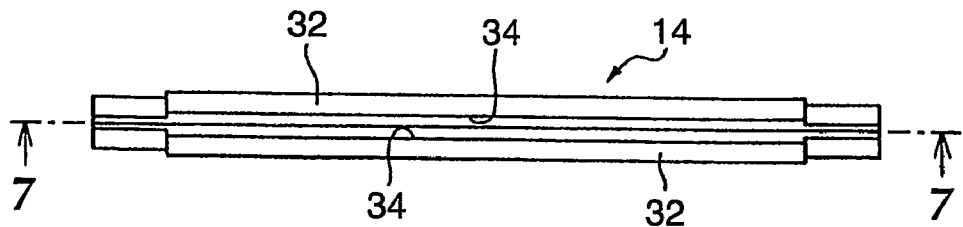
FIG. 6(a–c) are views of a fiber-element securing member in the optical fiber connecting device of FIG. 1, wherein (a) is a plan view, (b) is a front view and (c) is an end view.
Figure 6B:
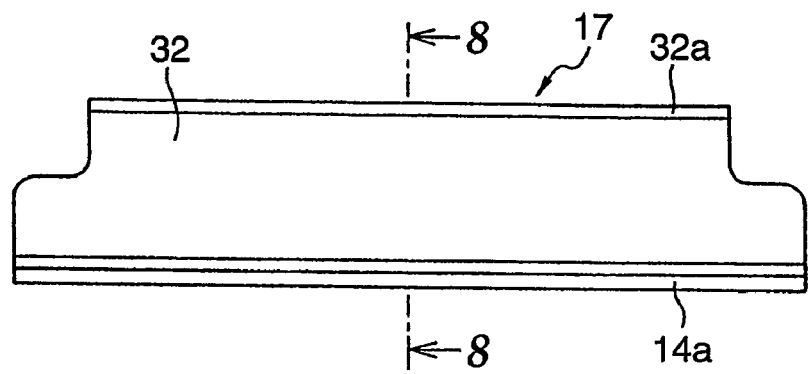
Figure 6C:
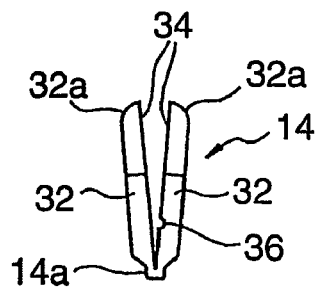
Figure 7:
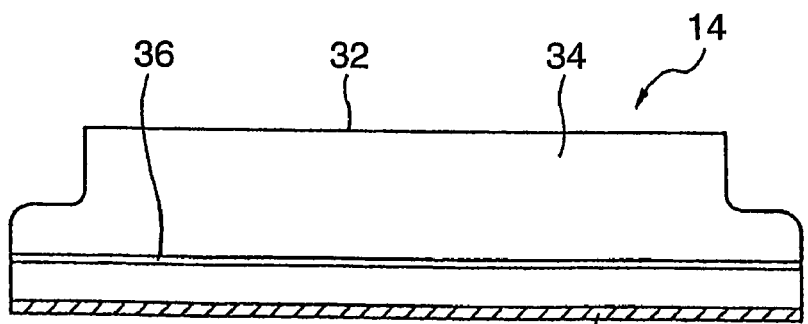
FIG. 7 is a sectional view of the fiber-element securing member taken along a line VII—VII in FIG. 6.
Figure 8:
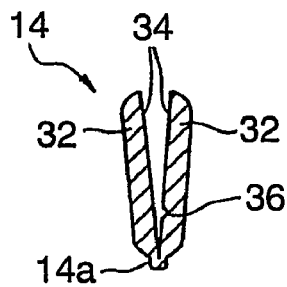
FIG. 8 is a sectional view of the fiber-element securing member taken along a line VIII—VIII in FIG. 6.

Referring to FIGS. 6 to 8, the fiber-element securing member 14 assumes such a form that a thin plate member, made of a malleable material such as aluminum in a predetermined shape, is folded into two along the center line thereof. The fiber-element securing member 14 folded into two has a pair of wings 32 arranged facing each other via the hinge edge 14a which runs along the folded line, and holding surfaces 34 are formed on the opposing surfaces of the wings 32 so as to be opened and closed to secure the uncoated fiber elements C of the optical fibers F. In the illustrated embodiment, a straight guide groove 36 (e.g., V-groove of a V-shape in cross section) is formed in the holding surface 34 of one wing 32 at a predetermined position in parallel with the hinge edge 14a to hold the uncoated fiber elements C of the optical fibers at a predetermined position. The guide groove may be formed in both of the pair of holding surfaces 34 in alignment.

The pair of wings 32 of the fiber-element securing member 14 are allowed to swing, i.e., are allowed to be opened and closed with the hinge edge 14a as a center accompanied by the elastic deformation of the material in the region of the hinge edge 14a. Usually, the fiber-element securing member 14 has both wings 32 opened (FIG. 6(c)) with their holding surfaces 34 being slightly separated away from each other. Upon exerting an external force to the two wings 32 in a direction toward each other from this open position, the holding surfaces 34 undergo the displacement toward the closed position where they are intimately contacted to each other overcoming the elastic restoring force of the hinge edge 14a. When the fiber-element securing member 14 is at the opened position, the uncoated fiber element C of the optical fiber is allowed to be smoothly inserted in, or removed from, the guide groove 36. When the fiber-element securing member 14 is at the closed position, the uncoated fiber element C of the optical fiber received in the guide groove 36 is strongly held receiving the pressure from both holding surfaces 34.

The fiber-element securing member 14 is accommodated in the first portion 18a of the cavity 18 in the body 12 with the hinge edge 14a being placed on the support groove 20 of the body 12, so as to be opened and closed (see FIGS. 13 and 14). In this case, both wings 32 of the fiber-element securing member 14 are arranged facing, maintaining a gap, both end walls 12b in the transverse direction of the body 12. When the fiber-element securing member 14 is accommodated at a proper position in the cavity 18 of the body 12, the guide groove 36 is arranged to be in concentric and in alignment with the pair of passage grooves 22 of the body 12 at the closed position.

Figure 9A:
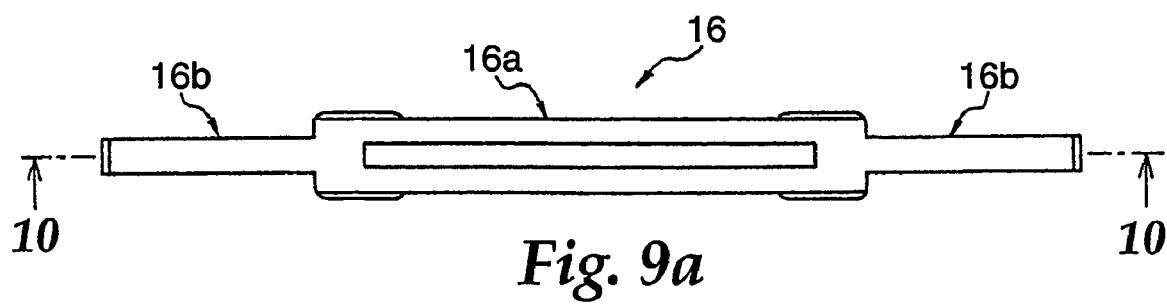
FIG. 9(a–c) are views of an actuating member in the optical fiber connecting device of FIG. 1, wherein (a) is a plan view, (b) is a front view and (c) is an end view.
Figure 9B:
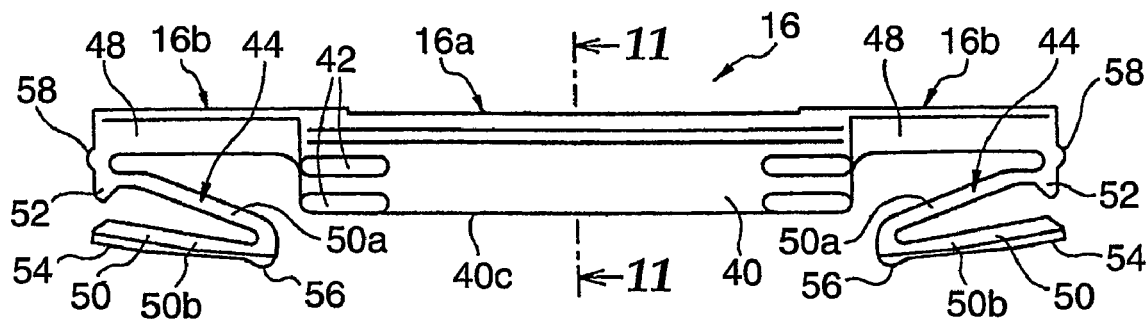
Figure 9C:
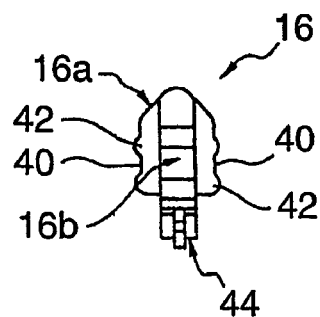

Referring to FIGS. 9 to 11, the actuating member 16 is a rod obtained by, for example, molding a resin material and includes a first functional portion 16a having nearly a U-shape in transverse cross section and located at the center in the longitudinal direction and a pair of second functional portions 16b extending in the longitudinal direction from both ends of the first functional portion 16a. The first functional portion 16a of the actuating member 16 has a pair of embracing walls 40 defining a recessed portion 38 of a size for receiving both wings 32 of the fiber-element securing member 14. The actuating member 16 has a symmetrical shape on the imaginary center planes TP and LP dividing the recessed portion 38 of the first functional portion 16a into two in the longitudinal direction and in the transverse direction.

The pair of embracing walls 40 provided in the first functional portion 16a of the actuating member 16 are opposed to each other nearly in parallel maintaining a predetermined gap, the opposing surfaces being stepped to form primary pressing surfaces 40a on the opening side of the recessed portion 38 and secondary pressing surfaces 40b on the back side of the recessed portion 38. Therefore, the recessed portion 38 in the first functional portion 16a includes a region of the opening side which is relatively wide being defined by the two primary pressing surfaces 40a and a region of the back side which is relatively narrow being defined by the two secondary pressing surfaces 40b. The embracing walls 40 have a plurality of shoulder faces 42 locally formed at predetermined positions on the outer surfaces thereof on the side opposite to the pressing surfaces 40a and 40b for bringing the actuating member 16 into engagement with the body 12.

Referring to FIGS. 12 to 14, the actuating member 16 is movably mounted in the cavity 18 so as to complementarily close the opening region of the cavity 18 in the body. Here, the actuating member 16 is arranged in the body 12 which is properly accommodating the fiber-element securing member 14 in the cavity 18, in a manner that both wings 32 of the fiber-element securing member 14 are received by the recessed portion 38 of the first functional portion 16a. In this state, the two embracing walls 40 of the actuating member 16 are interposed between the two end walls 12b in the transverse direction of the body 12 and the two wings 32 of the fiber-element securing member 14, and work to embrace the two wings 32 from the outer sides stepwise due to the pressing surfaces 40a and 40b. As will be described later, the actuating member 16 exerts the pressure in a direction in which the holding surfaces 34 are brought into intimate contact with the two wings 32 of the fiber-element securing member 14 from the two embracing walls 40 as it moves relative to the body 12 from the temporarily mounting position shown in FIGS. 12 to 14 to the finally mounting position shown in FIG. 2, whereby the fiber-element securing member 14 moves from the opened position to the closed position. At the finally mounting position in FIG. 2, the actuating member 16 complementarily constitutes the outer peripheral surface of the optical fiber connecting device 10 of the shape of a square pole in cooperation with the body 12.

The optical fiber connecting device 10 further includes a sheath holding mechanism 44 for securely holding, relative to the body 12, a portion S having a sheath neighboring the uncoated fiber element C (hereinafter referred to as a sheath portion S) of the optical fiber F with the uncoated fiber element C held by the fiber-element securing member 14. A feature in the constitution resides in that the sheath holding mechanism 44 is constituted by a pair of elastically deformable holding elements 44 formed on the pair of second functional portions 16b of the actuating member 16 (FIG. 9). When the actuating member 16 is properly mounted in the cavity 18 of the body 12 as described above, the holding elements 44 are accommodated in the pair of second portions 18b of the cavity 18 in the body 12 so as to undergo elastic displacements, and form a pair of passages 46 for guiding the optical fibers F in the second portions 18b in cooperation with the corresponding passage grooves 22 (FIG. 13). As will be described later, the holding elements 44 are elastically deformed as the actuating member 16 moves on the body 12 to move the fiber-element securing member 14 to the closed position, and work to press and hold the sheath portions S of the optical fibers F in the corresponding passage grooves 22 or passages 46 due to their own elastic restoring forces.

As shown in FIG. 9, the second functional portions 16b of the actuating member 16 further include beam elements 48 that extend in the longitudinal direction and in a fixed manner from both sides of the first functional portion 16b. Each holding element 44 has an elastic arm 50 that is folded in a V-shape and is extending from an end of each beam element 48 on the same side as the pair of embracing walls 40 of the first functional portion 16a. The elastic arm 50 includes a fixed end part portion 52 secured to an end of the beam element 48, a pressing part 54 formed at a free end separated away from the fixed end part 52, and an engaging part 56 formed in a bending region positioned between the fixed end part 52 and the pressing part 54. It is advantageous that the holding element 44 having the elastic arm 50 of the bent shape is formed integrally with the actuating member 16 from the standpoint of facilitating the steps of production. Each second functional portion 16b has a shoulder face 58 locally formed at a predetermined position neighboring the fixed end part 52 of the elastic arm 50 to bring the actuating member 16 into engagement with the body 12.

In a load-free condition where no elastic deformation is taking place (FIG. 9), a proximal end length 50a of the elastic arm 50, defined between the fixed end part 52 and the engaging part 56, extends in a manner to gradually separate away from the beam element 48 from the end of the beam element 48 toward the embracing wall 40 of the first functional portion 16a, and a free end length 50b of the elastic arm 50, defined between the engaging part 56 and the pressing part 54, extends in a manner to gradually approach the beam element 48 from the engaging part 56 toward the end of the beam element 48. Under the load-free condition, therefore, the elastic arm 50 is such that the end surface (the lower end surface in the drawing) of the region 50b of the free end side separated away from the region 50a of the base end side, is disposed farther away from the beam element 48 beyond the pressing part 54 in the engaging part 56 (FIG. 9(b)). In this state, further, the free end length 50b of the elastic arm 50 is disposed farther away from the beam element 48 beyond the lower edge 40c of the embracing wall 40 of the first functional portion 16a.

When an external force is exerted on the free end length 50b in a direction toward the beam element 48, the elastic arm 50 under the load-free condition elastically deflects in the region 50a of the base end side with the fixed end part 52 as a fulcrum and, at the same time, elastically deflects in the free end length 50b with the engaging part 56 (or the bending region) as a fulcrum. Accordingly, the elastic arm 50 as a hole undergoes the elastic displacement to approach the beam element 48. Here, the fixed end part 52 and the engaging part 56 (or the bending region) both have suitable lengths in a direction to intersect the region 50a of the base end side and the region 50b of the free end side. The elastic arm 50, therefore, is allowed to undergo the elastic displacement up to a position where both the proximal end length 50a and the free end length 50b extend substantially in parallel with the beam element 48. At the final position of displacement, in the illustrated embodiment, the lower end surface of the free end length 50b of the elastic arm 50 is drawn up to a position of substantially the same distance as the lower edge 40c of the embracing wall 40 of the first functional portion 16a with the beam element 48 as a reference.

Figure 15:
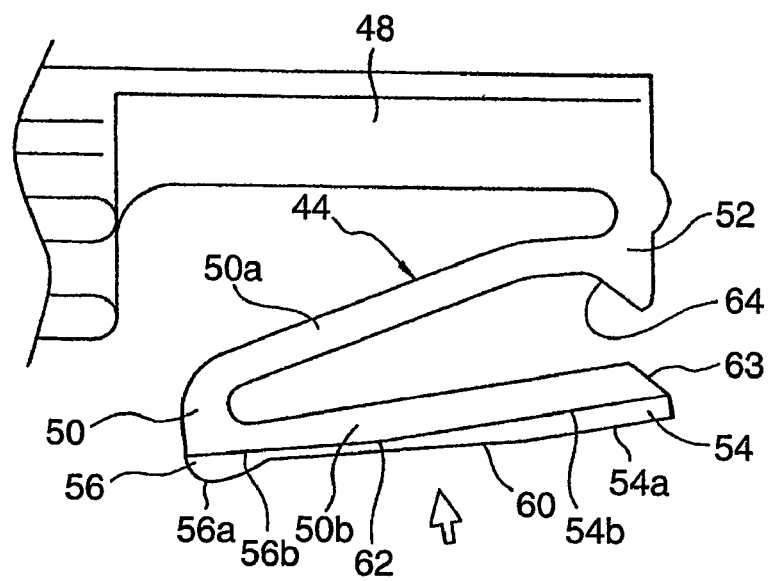
FIG. 15 is a partially enlarged front view illustrating a holding element of the optical fiber connecting device of FIG. 1 under a load-free condition.
Figure 16:
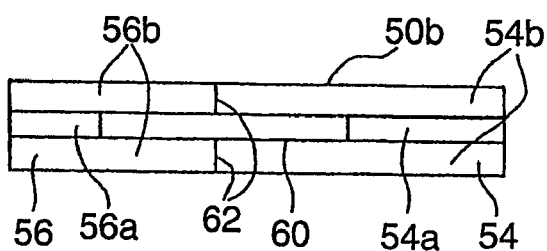
FIG. 16 is an end view of an elastic arm as viewed from an arrow XVI in FIG. 15.
Figure 17:
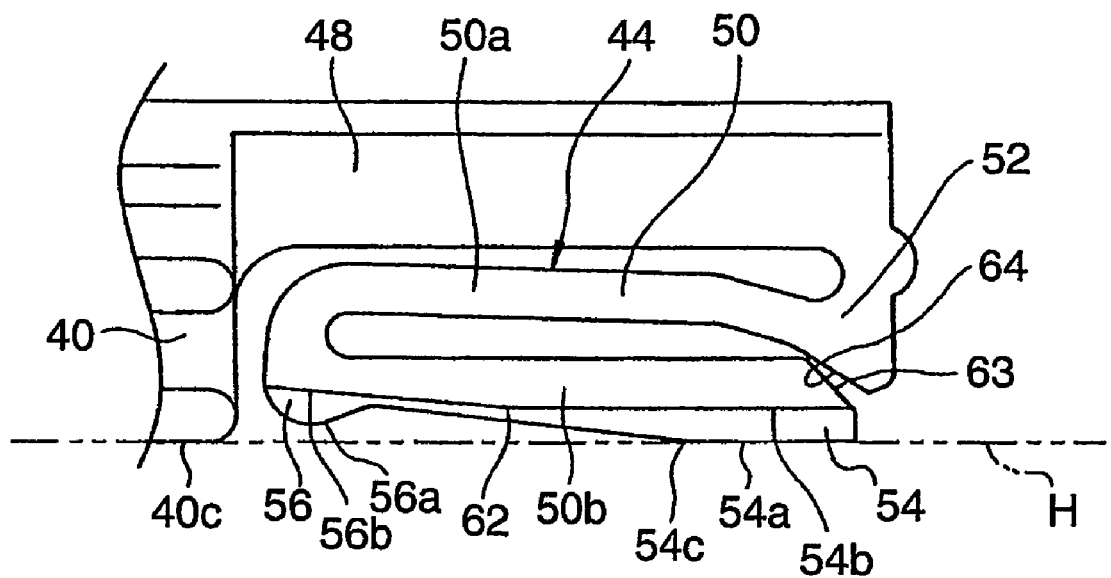
FIG. 17 is a partially enlarged front view illustrating the holding element of FIG. 15 in a finally displaced position.

In further detail with reference to FIGS. 15 to 17, the free end length 50b of the elastic arm 50 is provided, on the lower end face away from the proximal end length 50a, with a rib 60 extending along the longitudinal center thereof. The rib 60 has such a shape that the height on the lower end face of the free end length 50b increases in the pressing part 54 and in the engaging part 56, whereby a flat pressing surface 54a and a curved engaging surface 56a are bulgingly formed respectively in the pressing part 54 and the engaging part 56. Further, flat clear surfaces 54b, located at the opposite sides of the pressing surface 54a, are respectively formed at the transverse opposite sides of the rib 60 in the pressing part 54, and flat bearing surfaces 56b, located at the opposite sides of the engaging surface 56a, are respectively formed at the transverse opposite sides of the rib 60 in the pressing part 56. In each side of the rib 60, the clear surface 54b and the bearing surface 56b extend in the longitudinal direction of the rib 60, and are joined at a predetermined point (a mutual joint) 62 with each other while defining an obtuse angle therebetween. As illustrated, mutual joints 62 between the clear surfaces 54b and the bearing surfaces 56b are located in an intermediate region between the pressing surface 54a and the engaging surface 56a. Moreover, a tapered abut end face 63 is formed at a distal end of the free end length 50b on the side near the fixed end part 52 and opposite to the pressing surface 54a. When the elastic arm 50 has undergone the elastic displacement up to the above final position of displacement, the abut end face 63 is positioned to oppositely face to a receiving surface 64 of a corresponding shape formed on the fixed end part 52.

The elastic arm 50 cooperates with the body 12, as described later, during the elastic displacement toward the above-described final position of displacement, and thereby acts to rotate in its entirety about the fixed end part 52 in a direction toward the beam element 48. As a result, at the final position of displacement of the elastic arm 50, the pressing surface 54a of the pressing part 54 is disposed in a horizontal posture generally parallel to the lower edges 40c of the embracing wall 40 of the first functional portion 16a, and the engaging surface 56a of the engaging part 56 is disposed in a retracted position closer to the beam element 48 than the imaginary plane H involving the pressing surface 54a. Such a reversing motion of the free end length 50b of the elastic arm 50 will be described later in more detail.

At a position where the actuating member 16 is temporarily mounted as shown in FIG. 13, the elastic arm 50 of each holding element 44 has its free end length 50b disposed facing the passage groove 22 in the second portion 18b of the cavity, thereby to define the passage 46. Here, the pressing part 54 of each elastic arm 50 is disposed close to the corresponding inlet port 24 of the body 12. Further, the engaging part 56 of each elastic arm 50 is disposed facing a small-diameter portion 22a (FIG. 4) of the passage groove 22 neighboring the first portion 18a in the cavity, and the engaging surface 56a works in cooperation with the small-diameter portion 22a to form a locally constricted region 66 in the passage 46. The constricted region 66 in the passage 46 is arranged having a decreased diameter in concentric with the passage 46 to permit the passage of the uncoated fiber element C of the optical fiber F while blocking the passage of the sheath portion S of the optical fiber F. Therefore, the optical fiber F to be connected that is introduced into the passage 46 through the inlet port 24 has its uncoated fiber element C passing through the constricted region 66, linearly guided through the guide groove 36 in the fiber-element securing member 14 which is at the open position, whereby the sheath portion S is anchored in the constricted region 66 and is no more permitted to be inserted in the fiber-element securing member 14.

Figure 18:
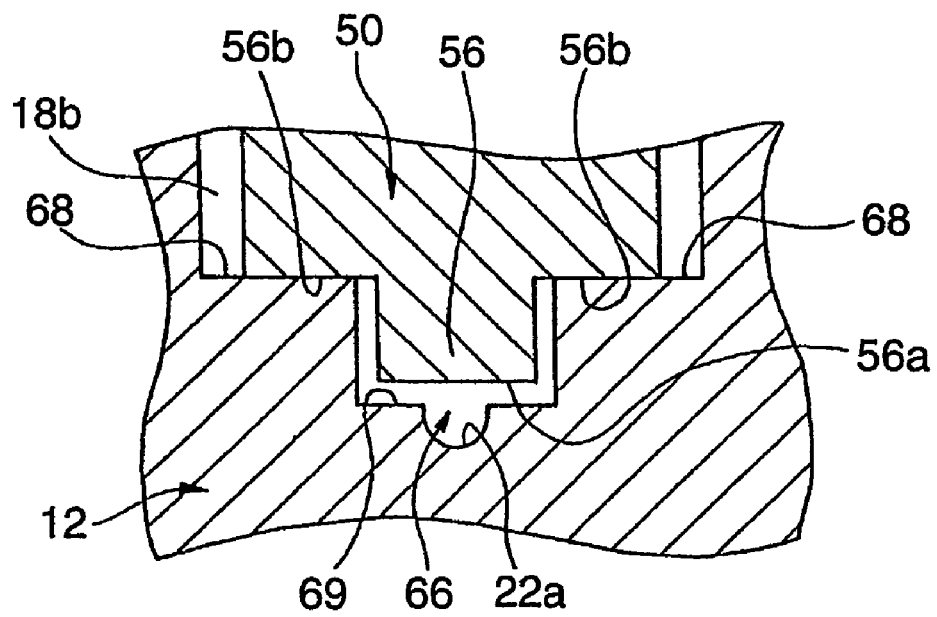
FIG. 18 is a sectional view taken along a line XVIII—XVIII in FIG. 13.

Here, at the position where the actuating member 16 is temporarily mounted as shown in an enlarged scale in FIG. 18, the distance between the engaging surface 56a of the engaging part 56 of the elastic arm 50 and the small-diameter portion 22a of the passage groove 22 in the body 12 (i.e., the radial dimension of the constricted region 66) is ensured by the bearing surfaces 56b provided in the engaging part 56 of the elastic arm 50, which respectively bear a pair of shoulder faces 68 (also shown in FIGS. 4 and 5) provided in the body 12 near both outer sides of the passage groove 22. As shown in the drawings, the transverse dimension of the rib 60 provided on the elastic arm 50 is formed larger than the radial dimension of the passage groove 22 (the small-diameter portion 22a in the drawing) in the body 12 and, corresponding to this, the transverse dimension of a recess defined between the shoulder faces 68 along the passage groove 22 in the body 12 is increased from the radial dimension of the passage groove 22 by enlarging faces 69 additionally extending in opposite sides of the passage groove 22. According to this structure, even if the transverse dimension of the recess between the shoulder faces 68 is made to be excessively larger than the transverse dimension of the rib 60 due to dimensional tolerances included respectively in the passage groove 22, the shoulder faces 68 and the rib 60, the uncoated fiber element C of the optical fiber F is surely caught in-between the small-diameter portion 22a of the passage groove 22 and the engaging surface 56a of the engaging part 56, and thus correctly passes through the constricted region 66 of the passage 46.

In the above-described temporarily mounted position, each elastic arm 50 is placed in a state of being slightly and elastically deflected due to the mutual abutment between the bearing surfaces 56b in the engaging part 56 and the shoulder faces 68 at the both sides of the passage groove 22 in the body 12. Even in this state, the engaging surface 56a of the engaging part 56 in each elastic arm 50 is still disposed remotely from the beam element 48 beyond the pressing surface 54a of the pressing part 54. Therefore, the pressing part 54 defines a sufficiently expanded introduction region in the passage 46 near the corresponding inlet port 24 (see FIG. 13).

One example of a fiber connecting operation in the optical fiber connecting device 10 having the above-described structure is described below with reference to FIGS. 19 to 22.

As a preparatory work, first, sheaths over a predetermined length are removed from the ends of the two (first and second) optical fibers F that are to be connected, so that the uncoated fiber elements C are exposed. The exposed uncoated fiber elements C are then cut at their ends into a predetermined length by using a special cutting tool (FIG. 1). As for the optical fiber connecting device 10, as described above, the fiber-element securing member 14 is properly mounted on the first portion 18a of the cavity 18 in the body 12, and the actuating member 16 is mounted on the body 12 so as to cover the fiber-element securing member 14 and is disposed at a temporarily mounting position (FIG. 13). At this temporarily mounting position, the fiber-element securing member 14 is received by a relatively wide region on the opening side of the recessed portion 38 defined by the primary pressing surfaces 40a of the two embracing walls 40 of the actuating member 14 (FIG. 14). Further, the actuating member 16 has its lower shoulder face 42 of the first functional portion 16a fitted into the upper dent 30 of the body 12 and has the shoulder faces 58 of the second functional portions 16b received by the dents 26 of the body 12. Thus, the actuating member 16 is temporarily anchored to the body 12.

As shown in FIG. 19, at the above temporarily mounting position, the uncoated fiber element C of the first optical fiber F is introduced into the corresponding passage 46 defined between the one passage groove 22 of the body 12 and the one elastic arm 50 of the actuating member 16. The first optical fiber F is smoothly guided in the passage 46 in a direction α in the drawing, whereby the uncoated fiber element C passes through the constricted region 66 of the passage 46 so as to be inserted in the guide groove 36 of the fiber-element securing member 14 that is at the opened position, and the sheath portion S engages with the engaging part 56 of the elastic arm 50 in the constricted region 66 in the passage 46 (FIG. 19(a)). In this state, the end of the uncoated fiber element C arrives at a position slightly beyond the center of the guide groove 36 of the fiber-element securing member 14. The pressing part 54 of the elastic arm 50 is disposed on the sheath portion S of the first optical fiber F in a non-contacting manner.

Next, the uncoated fiber element C of the second optical fiber F is introduced from the other inlet port 24 of the body 12 into the corresponding passage 46 defined between the other passage groove 22 of the body 12 and the other elastic arm 50 of the actuating member 16. The second optical fiber F is smoothly guided in the passage 46 in a direction β in the drawing, whereby the uncoated fiber element C passes through the constricted region 66 in the passage 46 and is inserted in the guide groove 36 in the fiber-element securing member 14 which is at the opened position. Here, as the second optical fiber F is inserted in the passage 46 over a suitable length, the uncoated fiber element C becomes abut with the uncoated fiber element C of the first optical fiber F in the guide groove 36. Here, as the second optical fiber F is further inserted in the passage 46 until the sheath portion S thereof is engaged in the constricted region 66, the first fiber F is pushed by the second optical fiber F and moves back in the direction β so as to be discharged from the passage 46 (FIG. 19(b)). By observing the first optical fiber F that is being discharged, the worker learns a state where the uncoated fiber elements C of the pair of optical fibers F are abut together at their ends in the guide groove 36 in the fiber-element securing member 14. The sheath portion S, too, of the second optical fiber F is disposed in the pressing part 54 of the elastic arm 50 in a non-contacting manner.

Figure 20:
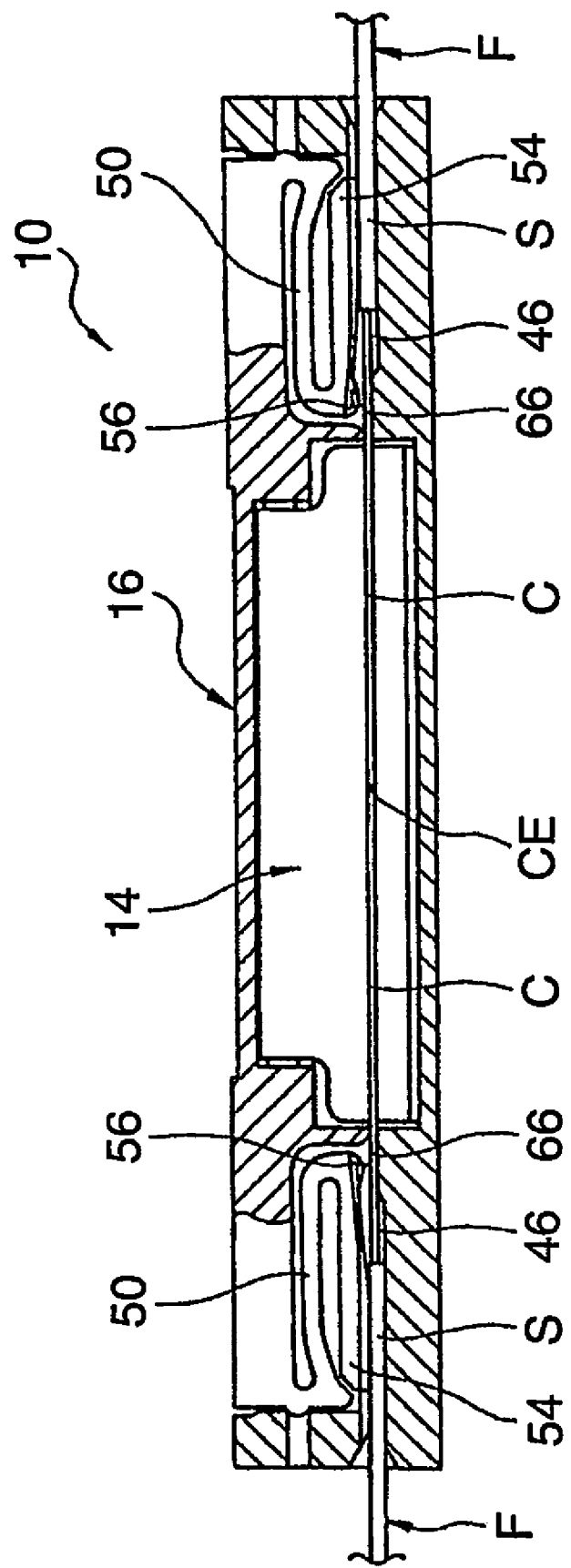
FIG. 20 is a sectional view illustrating a state where the fiber connecting operation by the optical fiber connecting device of FIG. 1 is completed.

Then, as required, the end positions of the two optical fibers F that are abutted together are generally centered with respect to the fiber-element securing member 14, and thereafter the actuating member 16 is forcibly pushed into the cavity 18 of the body 12. Accompanying the motion for pushing the actuating member 16, the fiber-element securing member 14 enters into the relatively narrow region on the back side defined by the secondary pressing surfaces 40b of the two embracing walls 40 of the actuating member 16, and moves from the opened position to the closed position as the two wings 32 receive the pressure from the secondary pressing surfaces 40b in a direction in which the holding surfaces 34 are brought into intimate contact with each other. Thus, the uncoated fiber elements C of the pair of optical fibers F are strongly held with pressure between the two holding surfaces 34 of the fiber-element securing members 14, and are connected together in concentric in the guide groove 36 (FIG. 20).

Figure 21A:
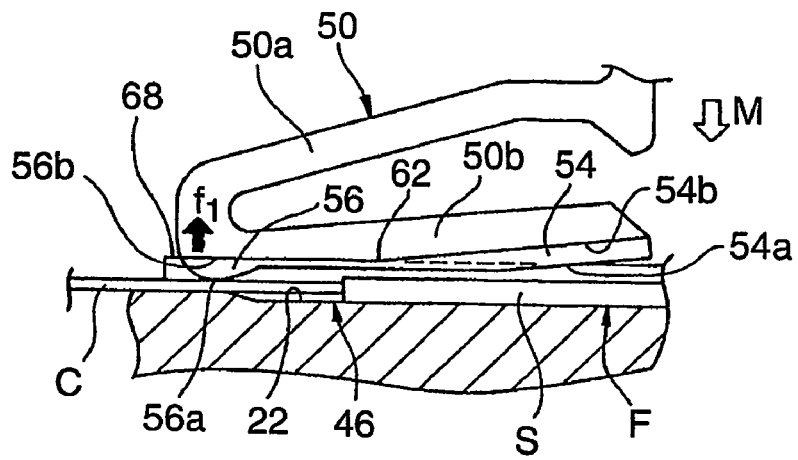
FIG. 21(a–c) are partially enlarged views, corresponding to FIGS. 19 and 20, for explaining a reversing motion of the elastic arm during the operation of the actuating member from (a) a temporarily mounted position, through (b) an intermediate position, to (c) a finally mounted position.
Figure 21B:
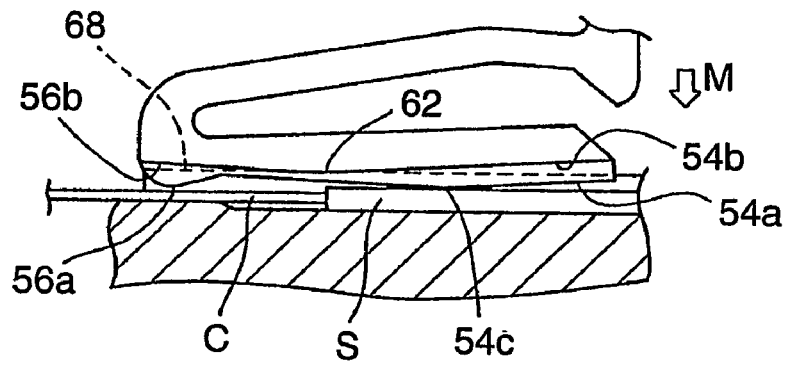
Figure 21C:
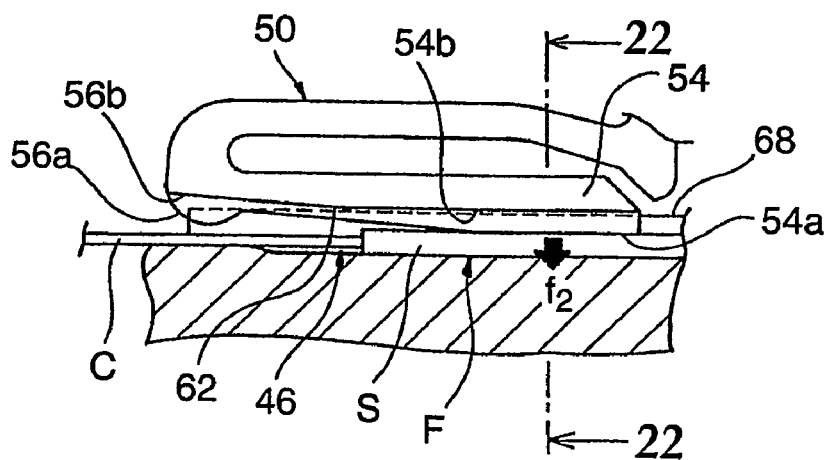
Figure 22:
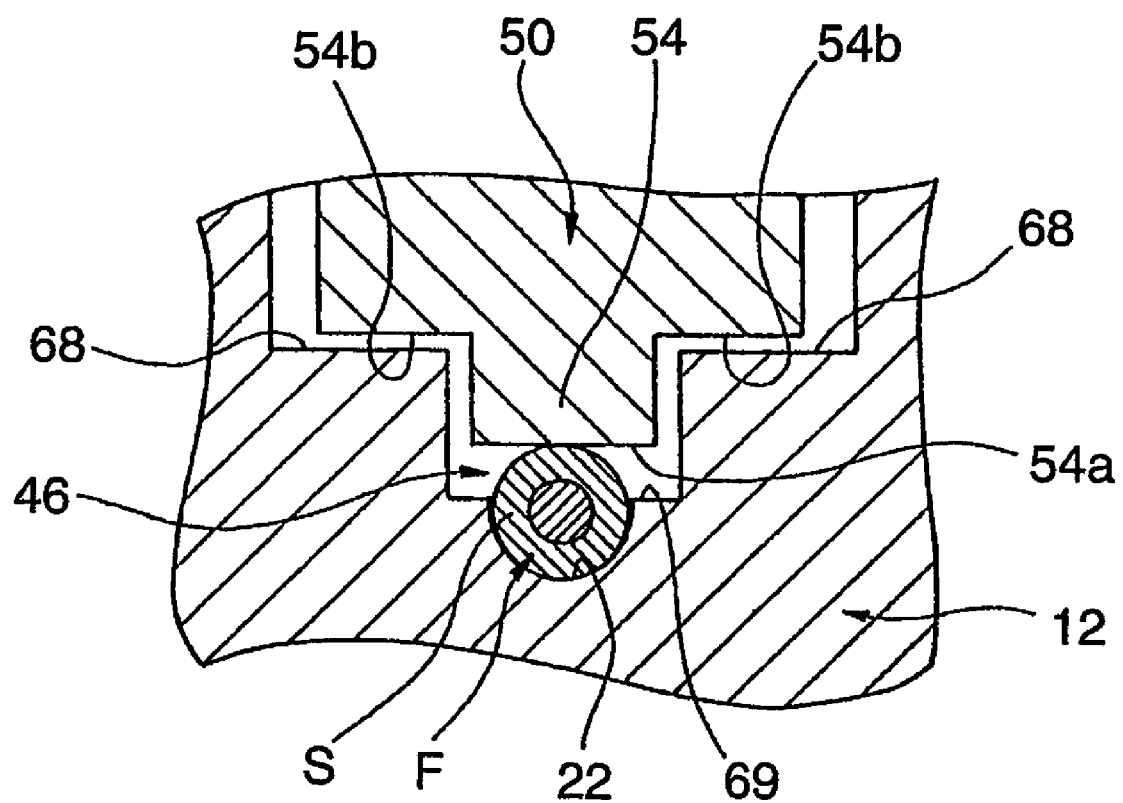
FIG. 22 is a sectional view taken along a line XXII—XXII in FIG. 21.

On the other hand, as shown in FIG. 21, while accompanying the above-described pushed motion M of the actuating member 16, the elastic arm 50 of each holding element 44 receives, at the bearing surfaces 56b of the engaging part 56, a reaction force f1 in a direction toward the beam element 48 (FIG. 17) from the shoulder faces 68 formed at the opposite sides of the corresponding passage groove 22 of the body 12 (FIG. 21(a)). As a result, the elastic arm 50 elastically deflects in its entirety in a direction toward the beam element 48. During this deflecting operation, the free end length 50b of the elastic arm 50 is subjected to a pivoting motion at a certain point of time, on the shoulder faces 68 about the mutual joints 62 as fulcrums, due to several structural factors in the elastic arm 50 in itself, such as a stress generated in the proximal and/or free end lengths 50a, 50b, a relative angle between the clear surfaces 54b and the bearing surfaces 56b on the free and length 50b, a position of the mutual joints 62, and so on, and thereby the bearing surfaces 56b are released from the shoulder surfaces 68. As the deflecting operation of the elastic arm 50 advances, the pivoting angle of the free end length 50b on the shoulder surfaces 68 is increased, and thereby the pressing surface 54a of the pressing part 54 comes into contact at an edge 54c (also shown in FIG. 17) thereof near the engaging surface 56a with the sheath portion S of the optical fiber F located in the passage 46 (FIG. 21(b)).

Just before the actuating member 16 is completely pushed into the cavity 18 of the body 12, each elastic arm 50 is pivoted in its entirety about the fixed end part 52 in a direction toward the beam element 48, and the pressing part 54 comes into contact on the pressing surface 54a with the sheath portion S of the optical fiber F, before the clear surfaces 54b come into contact with the shoulder surfaces 68 of the passage groove 22. Accompanied to this, the free end length 50b of the elastic arm 50 is subjected to the reversing motion as already described, wherein the engaging surface 56a of the engaging part 56 is retracted toward the beam element 48 further than the pressing surface 54a of the pressing part 54. As a result, in a finally mounted position where the actuating member 16 is completely pushed into the cavity 18 of the body 12, the elastic arm 50 of each holding element 44 functions in such a manner that the engaging part 56 fully opens the constricted region 66 of the passage 46 while the mutual joints 62 between the clear surfaces 54b and the bearing surfaces 56b are also released from the shoulder faces 68 of the passage groove 22 in the body 12, and that the pressing surface 54a of the pressing part 54 applies generally in its entirety a suitable pressing force f2 to the sheath portion S of the optical fiber F in the passage 46, due to the elastic restoring force of the elastic arm 50 itself (FIGS. 21(c) and 22).

It may be happened that, due to the error in structural factors in the elastic arm 50 itself, the above-described reversing motion of the free end length 50b is not caused in an expectable way and thereby the pressing part 54 cannot apply a pressing force to the sheath portion S of the optical fiber F in the passage 46. To avoid this malfunction, it is advantageous to dimension the elastic arm 50 in such a manner that the abut end face 63 (FIG. 17) of the free end length 50b is abutted on the receiving surface 64 (FIG. 17) of the fixed end part 52, in a case where the reversing motion is not caused in each elastic arm 50 just before the actuating member 16 reaches the finally mounted position. In this arrangement, a downward force caused due to the mutual abutment of the abut end face 63 and the receiving surface 64 is applied to the pressing part 54 of the elastic arm 50, which has not been reversed, and this force generates a lever function in the engaging part 56 about the edge 54c of the pressing surface 54a as a fulcrum, which is in contact with the sheath portion S of the optical fiber F. As a result, at an instant when the actuating member 16 reaches the finally mounted position, the free end length 50b of each elastic arm 50 is forcibly subjected to the reversing motion as desired, and thus the engaging part 56 is fully retracted toward the beam element 48. Also in this arrangement, the pressing force loaded from the pressing surface 54a of the pressing part 54 to the sheath portion S of the optical fiber F depends essentially on the elastic restoring force of the elastic arm 50.

In this way, as the actuating member 16 arrives at the finally mounted position on the body 12, the uncoated fiber elements C of the pair of optical fibers F are firmly held in an abutment condition in the guide groove 36 of the fiber-element securing member 14, and the sheath portions S of the two optical fibers F are pressed to be secured in the body 12 in the corresponding passages 46 under a suitable pressing force due to the elastic restoring force of the elastic arms 50 of the holding elements 44. In this state, the connection of the two optical fibers F is completed with their ends being abut together. At the finally mounted position, the actuating member 16 is secured to the body 12 with all shoulder faces 42 of the first functional portion 16a being fitted into all dents 30 in the body 12, and with the shoulder faces 58 of the second functional portions 16b being received by the through holes 28 in the body 12.

In the above-described fiber connecting operation, the uncoated fiber element C of the optical fiber F receives a pressure from the transition region between the primary pressing surfaces 40a and the secondary pressing surfaces 40b of the two holding surfaces 34 of the fiber-element securing member 14 immediately after the start of the pushing motion of the actuating member 16, and is substantially secured to the fiber-element securing member 14. In this step, however, the pressing part 54 of the elastic arm 50 is not still exerting a required pressing force on the sheath portion S of the optical fiber F. As the actuating member 16 is further pushed, the uncoated fiber element C of the optical fiber F receives an increasing holding force and is finally secured strongly. During this period, the pressing part 54 of the elastic arm 50 so works that the sheath portion S of the optical fiber F receives the pressing force that gradually increases with an increase in the amount of elastic deformation of the elastic arm 50. At the finally mounted position, the required pressing force due to the elastic restoring force of the elastic arms 50 is exerted on the sheath portions S of the optical fibers F. This operation timing reliably precludes such an occurrence that the positions of the uncoated fiber elements C are deviated in the fiber-element securing member 14 being caused by the pushing pressure for holding the sheath portions S of the optical fibers F in the passage 46.

In the above-described fiber connection operation, the elastic arms 50 of the holding elements 44 of the actuating member 16 are so constituted that the pressing parts 54 finally press and hold the sheath portions S of the optical fibers F in a surface contact condition by the pressing surfaces 54a, and that the engaging parts 56 are fully released from the uncoated fiber elements C in the passages 46. This constitution precludes such a probability that the pressing force is exerted on the end regions of the sheath portions S (regions neighboring the exposed uncoated fiber elements C) where stress tends to be concentrated on the uncoated fiber elements C. At the position where the actuating member 16 is temporarily mounted, further, the abut ends of the two optical fibers F are not necessarily positioned at the center of the fiber-element securing member 14. Advantageously, therefore, the pressing parts 54 of the elastic arms 50 are better formed at positions as close as possible to the inlet ports 24 of the body 12 from the standpoint of preventing the concentration of stress on the uncoated fiber elements C.

According to the optical fiber connecting device 10 constituted as described above, the sheath holding mechanism for firmly holding the sheath portions S of the optical fibers F to be connected is constituted by the holding elements 44 that are formed on the actuating member 16 and are capable of undergoing elastic deformation. As compared to the prior art using clip members as separate members, therefore, the number of the constituent parts is decreased and the steps of assembling the optical fiber connecting device 10 is simplified, i.e., the fiber connection operation is simplified. In the fiber connection operation, a required pressing force is exerted on the sheath portion S of the optical fiber F from the holding element 44 by pushing the actuating member 16 for holding the uncoated fiber element C of the optical fiber by the fiber-element securing member 14. Therefore, the connecting operation can be carried out by using a conventional widely-used tool.

The holding element 44 produces the pressing force (or a sheath-holding force) relying upon the elastic restoring force of the elastic arm 50 itself. Therefore, the dimensional error in the elastic arms 50 and in the sheathing of the optical fiber affects the sheath-holding force least. Therefore, the optical fiber connecting device 10 exhibits a stable sheath-holding function without affected by the dimensional error in the constituent parts.

The sheath holding mechanism of the optical fiber connecting device according to the invention is not limited to the one having the fiber-element securing member 14 that is folded into two as described above, but can also be applied to the optical fiber connecting devices having fiber-element securing members of various other forms. In this case, an optical fiber connecting device for connecting the uncoated fiber elements of a pair of optical fibers in an abutment condition of the invention, comprises a fiber-element securing member for securing the uncoated fiber elements of the optical fibers, and a sheath holding mechanism capable of firmly holding the sheath portions of the optical fibers having the uncoated fiber elements secured to the fiber-element securing member, wherein the sheath holding mechanism has holding elements that are independent from the fiber-element securing member and undergo elastic deformation, and the holding elements form a passage for guiding the optical fibers outside the fiber-element securing member, and push and hold the sheath portions of the optical fibers in the passages by utilizing their own elastic restoring forces.

As will be apparent from the foregoing description, the present invention provides an optical fiber connecting device for connecting the uncoated fiber elements of a pair of optical fibers in an abutment condition, wherein the number of the constituent parts is decreased to simplify the fiber connection operation, the fiber connection operation is carried out without using any special tool, and a stable sheath-holding function is exhibited without affected by dimensional errors in the constituent parts.

What is claimed is:

1. An optical fiber connecting device for connecting uncoated fiber elements of a pair of optical fibers with each other in an abutment condition, comprising a body, a fiber-element securing member supported on said body to be operable between a closed position for securely holding an uncoated fiber element of an optical fiber and an opened position for releasing the uncoated fiber element, an actuating member supported on said body to operate said fiber-element securing member from said opened position to said closed position, and a sheath holding mechanism capable of holding a sheath portion of the optical fiber, in a fixed state relative to said body, with the uncoated fiber element thereof being securely held by said fiber-element securing member, wherein:
   said sheath holding mechanism includes an elastically deformable holding element provided in said actuating member; and
   said holding element defines in said body a passage for guiding an optical fiber, and is elastically deformed due to a motion of said actuating member on said body for operating said fiber-element securing member toward said closed position, to press and hold a sheath portion of the optical fiber in said passage by an elastic restoring force of the holding element.

2. An optical fiber connecting device according to claim 1, wherein said holding element includes an elastic arm formed in said actuating member, said elastic arm including a fixed end part and a pressing part spaced away from said fixed end part for pressing the sheath portion of the optical fiber by an elastic restoring force of said elastic arm.

3. An optical fiber connecting device according to claim 2, wherein said elastic arm further includes an engaging part positioned between said fixed end part and said pressing part, said engaging part defining a constricted region in said passage for permitting an uncoated fiber element of the optical fiber to pass therethrough but for preventing the sheath portion of the optical fiber from passing therethrough.

4. An optical fiber connecting device according to claim 3, wherein said engaging part of said elastic arm opens said constricted region in said passage as the elastic arm is elastically deformed due to the motion of said actuating member on said body.

5. An optical fiber connecting device according to claim 2, wherein said body includes an inlet port opening in an outer surface of said body and communicated with said passage, said pressing part of said elastic arm being arranged close to said inlet port.

6. An optical fiber connecting device according to claim 1, wherein said holding element is integrally formed on said actuating member.

7. An optical fiber connecting device for connecting uncoated fiber elements of a pair of optical fibers with each other in an abutment condition, comprising a fiber-element securing member for securing an uncoated fiber element of an optical fiber, and a sheath holding mechanism capable of holding a sheath portion of the optical fiber, in a fixed state, with the uncoated fiber element thereof being secured by said fiber-element securing member, wherein:
   said sheath holding mechanism includes a holding element elastically deformable independently from said fiber-element securing member; and
   said holding element defines a passage for guiding an optical fiber outside of said fiber-element securing member, and presses and holds a sheath portion of the optical fiber in said passage by an elastic restoring force of the holding element.

* * * * *